（12）United States Patent
Evans

(10) Patent No.: US 10,148,523 B1
(45) Date of Patent: Dec. 4, 2018

(54) RESETTING COMPUTING RESOURCES IN A SERVICE PROVIDER NETWORK

(71) Applicant: Amazon Technologies, Inc., Seattle, WA (US)

(72) Inventor: Aaron Thomas Evans, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 317 days.

(21) Appl. No.: 14/027,971

(22) Filed: Sep. 16, 2013

(51) Int. Cl.
*G06F 3/048* (2013.01)
*H04L 12/24* (2006.01)

(52) U.S. Cl.
CPC .................................. *H04L 41/22* (2013.01)

(58) Field of Classification Search
None
See application file for complete search history.

(56) References Cited

U.S. PATENT DOCUMENTS

| | | | | | |
|---|---|---|---|---|---|
| 6,542,926 | B2 * | 4/2003 | Zalewski | ............... | G06F 9/5077 709/213 |
| 7,640,451 | B2 * | 12/2009 | Meyer | ................... | G06F 3/0605 714/4.11 |
| 7,865,663 | B1 * | 1/2011 | Nelson | ..................... | G06F 13/42 711/112 |
| 8,381,264 | B1 * | 2/2013 | Corddry | ................... | H04L 67/22 726/3 |
| 8,949,653 | B1 * | 2/2015 | Kayan | .................. | G06F 11/0709 714/1 |
| 2006/0085664 | A1 * | 4/2006 | Nakamura | ............ | G06F 11/008 714/1 |
| 2007/0237096 | A1 * | 10/2007 | Vengroff | .................. | H04W 4/02 370/254 |
| 2010/0070784 | A1 * | 3/2010 | Gupta | .................... | G06F 1/3203 713/310 |
| 2011/0029971 | A1 * | 2/2011 | Yamasaki | ........... | G06F 9/45558 718/1 |
| 2011/0126207 | A1 * | 5/2011 | Wipfel | .................. | H04L 9/3213 718/104 |
| 2012/0011505 | A1 * | 1/2012 | Fujisaki | .............. | G06F 9/45558 718/1 |
| 2012/0297307 | A1 * | 11/2012 | Rider | ................... | G06F 11/3433 715/736 |
| 2012/0311576 | A1 * | 12/2012 | Shu | ...................... | G06F 9/45558 718/1 |
| 2013/0054950 | A1 * | 2/2013 | Tsirkin | .................. | G06F 9/4408 713/2 |

(Continued)

*Primary Examiner* — Andrey Belousov
*Assistant Examiner* — Haimei Jiang
(74) *Attorney, Agent, or Firm* — Lee & Hayes, PC

(57) ABSTRACT

Functionality is disclosed for resetting the operation of computing resources, such as computing resources provided by a service provider network. In one implementation an interface is exposed for receiving requests to reset the operation of computing resources in a service provider network. Such a request may specify one or more constraints on the manner in which the computing resources are to be reset, such as constraints that define a limit on the computing resources that can be simultaneously out of service as a result of a reset operation. In response to receiving such a request, the operation of the computing resources is reset in a manner that satisfies the specified constraints.

22 Claims, 7 Drawing Sheets

(56) References Cited

U.S. PATENT DOCUMENTS

| | | | | |
|---|---|---|---|---|
| 2013/0132945 A1* | 5/2013 | Anderson | .................. | G06F 8/65 |
| | | | | 718/1 |
| 2013/0227675 A1* | 8/2013 | Fujioka | ................... | G06F 21/30 |
| | | | | 726/16 |
| 2013/0297970 A1* | 11/2013 | Callaway | ............ | G06F 11/1641 |
| | | | | 714/15 |
| 2013/0326505 A1* | 12/2013 | Shah | ........................ | G06F 9/455 |
| | | | | 718/1 |
| 2014/0007097 A1* | 1/2014 | Chin | ................... | G06F 9/45533 |
| | | | | 718/1 |
| 2014/0245293 A1* | 8/2014 | Tsirkin | .................... | G06F 9/455 |
| | | | | 718/1 |
| 2015/0074279 A1* | 3/2015 | Maes | .................... | G06F 9/5072 |
| | | | | 709/226 |

* cited by examiner

RESETTING COMPUTING RESOURCES IN A SERVICE PROVIDER NETWORK

BACKGROUND

Some network-based computing service providers allow customers to purchase and utilize computing resources (which may be referred to herein as "resources"), such as virtual machine instances, on a permanent or as-needed basis. In addition to virtual machine instances, such computing service providers typically allow customers to purchase and utilize other types of computing resources. For example, customers might be permitted to purchase access to and use of file and block data storage resources, database resources, networking resources, and other types of computing resources that are provided by a service provider.

Utilizing computing resources such as those described above as building blocks, customers of such a network-based computing service can create custom solutions that provide various types of functionality, such as application hosting, backup and storage, content delivery, World Wide Web ("Web") hosting, enterprise information technology ("IT") solutions, database services, and others. Management of the computing resources utilized to provide such custom solutions can sometimes, however, be a difficult and time-consuming process. In particular, it may be difficult to reset the operation of computing resources provided by a service provider in response to an error condition or another type of operational difficulty. Resetting the operation of computing resources is typically done manually, which can be time consuming especially when large numbers of computing resources are utilized.

The disclosure made herein is presented with respect to these and other considerations.

DETAILED DESCRIPTION

Figure 1:
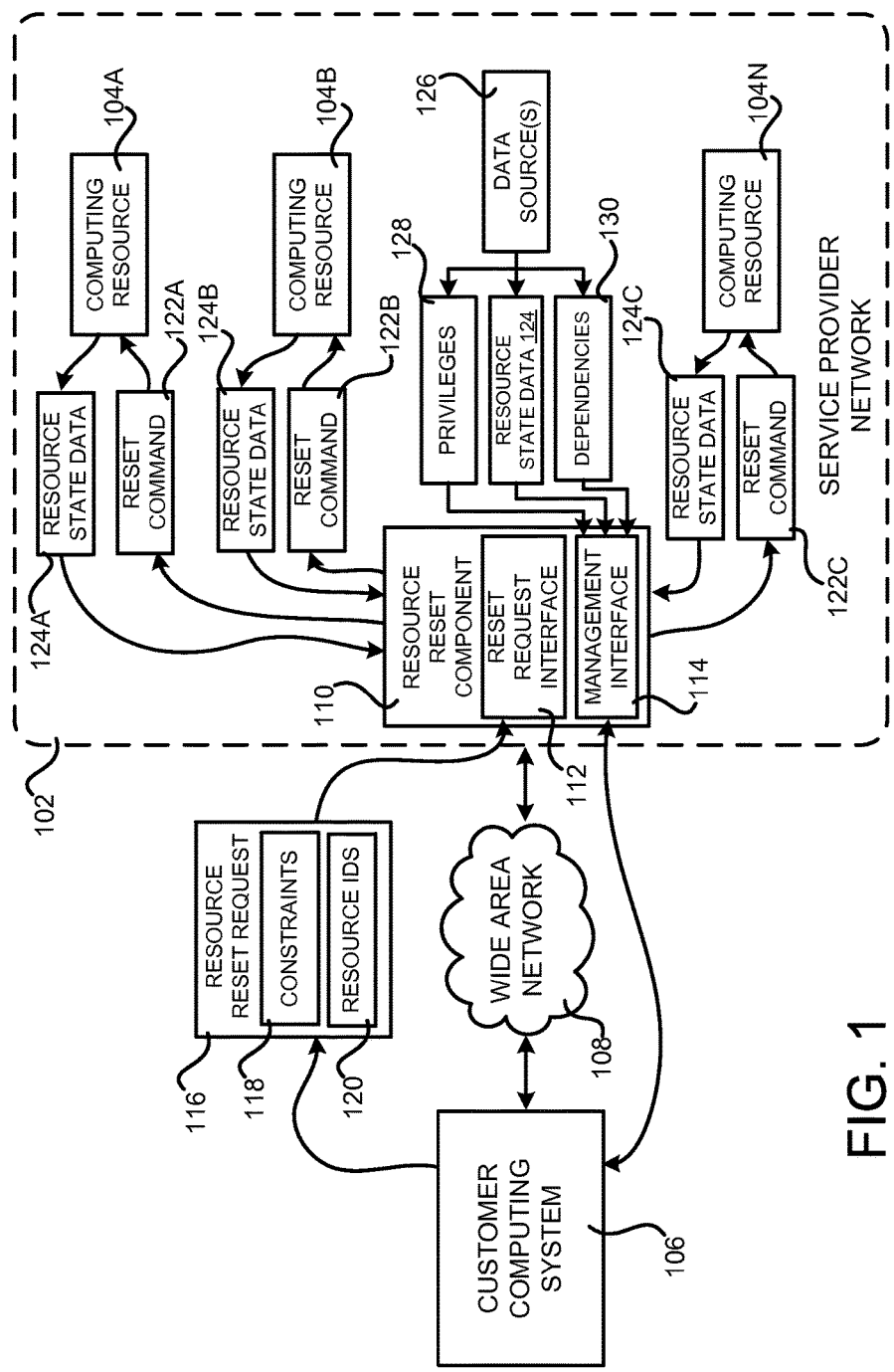
FIG. 1 is a network architecture diagram showing aspects of the operation of one illustrative mechanism disclosed herein for resetting computing resources in a service provider network, according to one embodiment.

The following detailed description is directed to technologies for resetting the operation of computing resources provided by a service provider network. Utilizing the technologies described herein, a customer or other user of a network-based computing service provider can reset the operation of computing resources provided by the service provider in an automated fashion. Additionally, virtually any number of heterogeneous computing resources can be reset in a coordinated fashion. For example, and without limitation, computing resources can be reset in groups, in a specified order, based upon dependencies among the resources, and also in a manner that satisfies user-specified constraints on the manner in which the resources are reset. Additional details regarding these and other aspects presented herein will be described below.

According to embodiments presented herein, computer-implemented mechanisms are disclosed for resetting computing resources. The mechanisms disclosed herein might operate in conjunction with a service provider operated network-based distributed computing environment (which may be referred to herein as a "service provider network") through which customers can purchase and utilize computing resources, such as virtual machine instances, data storage resources, database resources, network-accessible services, networking resources, and other types of computing resources on a permanent or as-needed basis.

In order to provide the functionality described above, a resource reset component is provided in the service provider network. The resource reset component is a software and/or hardware component that is configured in one embodiment to provide a management interface, such as an application programming interface ("API") or a graphical user interface ("GUI"), through which a user can define the manner in which certain resources within the service provider network are to be reset. For instance, and without limitation, the management interface might allow the user to specify user privileges identifying those users that are permitted to utilize the resource reset component to reset computing resources, to designate resources as being resettable, to define groups of resources that are to be reset simultaneously, to define the order in which resources are to be reset, and/or to define dependencies between resources that can be utilized to determine the order in which the resources are reset. The resource reset component might obtain some or all of this information from other sources in other embodiments.

The resource reset component is also configured in one embodiment to expose a reset request interface through which requests to reset computing resources provided by the service provider network can be received. For example, and without limitation, the reset request interface may be provided as an API or GUI through which resource reset requests are received. In one implementation, the resource reset requests identify the computing resources that are to be reset. For example, a resource reset request might specify individual computing resources to be reset, or a group, or groups, of computing resources that are to be reset. The computing resources to be reset might also be specified in other ways in other implementations.

Resource reset requests might also specify one or more constraints to be utilized when resetting the identified computing resources in the service provider network. For example, and without limitation, the constraints might define a limit on the number or percentage of computing resources that can be simultaneously out of service as a result of a reset operation. As another example, the constraints might define a time period during which the resources should be reset (e.g. between midnight and four a.m.). The constraints might also be specified on a per resource type basis. For example, one set of constraints might be specified for virtual machine instances that are to be reset and another set of constraints might be specified for use in resetting data storage resources. Other types of constraints might also be specified. Additionally, constraints on the manner in which computing resources are reset might also be specified through the management interface, obtained from another system or component, or in another manner.

When the reset request interface receives a resource reset request, the resource reset component is configured to reset the identified computing resources in the service provider network in a manner that satisfies the constraints. For example, and without limitation, the resource reset component might cause only a certain number of resources to be reset at a time in order to ensure that any restrictions on resource availability specified by the constraints are satisfied. The resource reset component might also reset the identified resources during the time period specified by the constraints. The resource reset component might also take other types of actions to ensure that the computing resources are reset in a manner that satisfies the specified constraints.

The resource reset component might also reset the identified computing resources in a manner that satisfies any other criteria specified through the management interface or through another mechanism. For example, and without limitation, only computing resources in an identified group may be reset, the computing resources might be reset in a specified order, and dependencies between the resources might be utilized to determine the order in which the resources are reset. Additionally, only resources that have been designated as being resettable may be reset, and resources may only be reset in response to resource reset requests generated by users that have appropriate privileges to reset the resources.

In some embodiments the computing resources are configured to provide resource state data that describes that describes aspects of the current state of the resources, such as their current availability. The resource reset component may utilize the resource state data to reset the resources in a manner that satisfies the constraints. For example, and without limitation, the resource reset component may utilize the resource state data to ensure that only a certain number or percentage of the computing resources are out of service at a time due to being reset.

In order to reset a computing resource, the resource reset component may transmit a reset command to the computing resource. Depending upon the type of computing resource, the reset operation might take different forms. For example, resetting a hardware device might consist of "rebooting" the device or performing an initial program load ("IPL"). A virtual machine instance might also be rebooted in order to reset its operation. Resetting software components might involve terminating and restarting execution of the software components. The operation of other types of computing resources might also be reset in other ways. Additional details regarding the various components and processes described above for resetting computing resources in a service provider network will be presented below with regard to FIGS. 1-7.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a network architecture diagram showing aspects of one illustrative mechanism described herein for resetting computing resources. As described briefly above, the various mechanisms disclosed herein might operate in conjunction with a service provider network 102, from which customers can purchase and utilize computing resources 104A-104N (which may be referred to herein as "resources 104"), such as virtual machine instances or other types of computing resources, from a service provider on a permanent or as-needed basis.

Each type or configuration of a computing resource 104 may be available from the service provider network 102 in different sizes. For example, a service provider might offer virtual machine instances or other types of data processing resources that are available for purchase and use that have many different configurations of processor capabilities, main memory, disk storage, and operating system. A service provider might also offer other types of resources 104 for purchase and use by customers. For example, a service provider might offer hardware devices, database resources, file or block data storage resources, and/or networking resources, such as load balancing resources, domain name service ("DNS") resources, virtual private cloud ("VPC") resources, virtual local area network ("VLAN") resources, and/or other types of hardware and software computing resources on a permanent or as-needed basis. Details regarding several illustrative configurations for certain types of data processing resources will be provided below with regard to FIG. 6.

The service provider operating the service provider network 102 might also charge a fee for operating the resources 104 to a customer that creates and uses the resources 104. The fee charged for a particular resource 104 might be based upon the type and/or configuration of the resource 104. The fee charged for a particular resource 104 might also be based upon the amount of time the resource 104 is utilized. For example, in the case of a data processing resource, like a virtual machine instance, the fee for use of the resource might be charged based upon the amount of time the resource is utilized. In the case of a data storage resource 104, the fee might be computed based upon the amount of data stored and/or the amount of data transferred into or out of the resource. The fees for other types of resources 104 might also be based upon other considerations. A service provider might also utilize various purchasing models to determine the amount to charge a customer for use of resources 104 provided by the service provider network 102. Details regarding several illustrative purchasing models utilized with certain types of resources 104 will also be described below with regard to FIG. 6.

The resources 104 described above may be provided in one particular implementation by one or more data centers operated by the service provider. As known to those skilled in the art, data centers are facilities utilized to house and operate computer systems and associated components. Data centers also typically include redundant and backup power, communications, cooling, and security systems. The data centers might be located in geographically disparate locations, and might also be connected to various other facilities, such as co-location facilities, and various wide area networks ("WANs") 108, such as the Internet. In the environment shown in FIG. 1, a service provider might operate one or more data centers configured to provide the resources 104 in the service provider network 102 to its customers. Details regarding one implementation of a service provider network 102 will be provided below with regard to FIGS. 4 and 5.

The various resources 104 described above might also be provisioned and de-provisioned as needed in an automated fashion. For example, a customer might submit a request to the service provider network 102 to instantiate a new instance of a computing resource 104, such as an instance of a virtual machine. In response to receiving such a request, a provisioning component (not shown in FIG. 1), or one or more other components within the service provider network 102, might create the new instance of the virtual machine as requested by the customer. The customer may then be permitted to utilize the new instance of the virtual machine as desired.

When the customer has finished using the virtual machine instance, the customer may request that the virtual machine instance be de-provisioned. In response thereto, the provisioning component, or another component in the service provider network 102, may cause the virtual machine instance to be de-provisioned. Other types of computing resources 104 might also be provisioned and de-provisioned in a similar manner. The service provider network 102 might also provide functionality for automatically scaling and/or de-scaling resources 104 based upon demand for the resources 104 or other factors.

As shown in FIG. 1, a customer or potential customer of a service provider might utilize a customer computing system 106 to communicate with the service provider network 102 over the WAN 108. In this way, the customer computing system 106 may be utilized to configure various aspects of the operation of the computing resources 104. For example, and without limitation, the customer computing system 106 may be utilized to purchase computing resources 104 in the service provider network 102, to configure aspects of the operation of the computing resources 104, and to perform other types of functionality with regard to the operation of the computing resources 104. The customer computing system 106 may be any type of computing device capable of connecting to the service provider network 102 via a WAN 108 such as, but not limited to, a laptop or desktop computer, a tablet computing device, a server computer, or a mobile telephone.

As discussed briefly above, a customer of the service provider network 102 may utilize the computing resources 104 as building blocks when creating custom solutions. For example, resources 104 provided by the service provider network 102 can be utilized to create custom solutions that provide various types of functionality, such as application hosting, backup and storage, content delivery, Web hosting, enterprise IT solutions, database services, and others. As also discussed briefly above, management of the computing resources 104 utilized to provide such custom solutions can sometimes be a difficult and time-consuming process. In particular, it may be difficult for a customer or other user of the service provider network 102 to reset the operation of certain computing resources 104 provided by the service provider network 102 in response to an error condition or for another reason.

In order to address the considerations set forth above, and potentially others, the service provider network 102 may provide functionality for allowing customers and other users of the service provider network 102 to reset the computing resources 104 in a well-defined and coordinated manner. In order to provide this and other functionality, a resource reset component 110 is provided in the service provider network 102 in one implementation. As discussed briefly above, the resource reset component 110 is a software and/or hardware component that is configured to provide functionality for resetting computing resources 104 within the service provider network 102.

In one particular embodiment, the resource reset component 110 provides a management interface 114, such as an API or a GUI, through which a user can define the manner in which computing resources 104 operating within the service provider network 102 are to be reset. For instance, and without limitation, the management interface 114 might allow the user to specify user privileges identifying those users that are permitted to utilize the resource reset component 110 to reset computing resources 104, to define the resources 104 each user is permitted to reset, to designate resources 104 as being resettable, to define groups of resources 104 that are to be reset simultaneously, to define the order in which resources 104 are to be reset, and/or to define dependencies between resources 104 that can be utilized to determine the order in which the resources 104 are reset. Additional details regarding the operation of the management interface 114 will be provided below with regard to FIG. 2.

The resource reset component 110 might also be configured in embodiments to obtain data from one or more other data sources 126 for use in resetting the computing resources 104. For example, and without limitation, the resource reset component 110 might obtain the resource state data 124 described above, data defining the privileges 128 of users to reset the computing resources 104, and/or data 130 defining the dependencies between the resources 104 from another data source 126. The resource reset component 110 might also obtain other types of information from other data sources 126 for use in resetting the operation of the computing resources 104. The data sources 126 might be devices, systems, data stores, or other types of components configured to collect, maintain, and provide data to the resource request component 110 and/or other systems or components.

The resource reset component 110 is also configured in one embodiment to expose a reset request interface 112 through which requests to reset computing resources 104 provided by the service provider network 102 can be received. For example, and without limitation, the reset request interface 112 may be provided as an API or GUI through which resource reset requests 116 are received. In one implementation, the resource reset requests 116 provide resource identifiers ("IDs") 120 that identify the computing resources 104 that are to be reset. For example, a resource reset request 116 might specify the resource IDs 120 of individual computing resources 104 to be reset. In other implementations, the resource reset requests 116 might specify a group, or groups, of computing resources 104 that are to be reset simultaneously. The computing resources 104 that are to be reset might also be specified in other ways in other implementations.

In some implementations, resource reset requests 116 also specify one or more constraints 118 that are to be utilized by the resource reset component 110 when resetting the computing resources 104 identified by the resource reset request 116. For example, and without limitation, the constraints 118 might define a limit on the number or percentage of computing resources 104 that can be simultaneously out of service as a result of a reset operation. The constraints 118 might also specify a specific time or time period during which the computing resources 104 are to be reset. As mentioned above, the constraints 118 might also be specified on a per resource type basis. For example, one set of constraints 118 might be specified for virtual machine instances operating in the service provider network 102 that are to be reset, and another set of constraints 118 might also be specified for use in resetting data storage resources operating in the service provider network 102. Other types of constraints 118 might also be specified. Additionally, constraints 118 on the manner in which computing resources 104 in the service provider network 102 are reset might also be specified through the management interface 114, through another interface, or in another manner altogether.

When the reset request interface 112 receives a resource reset request 116, the resource reset component 110 resets the computing resources 104 in the service provider network 102 that are identified by the request 116. For instance, in one implementation the resource reset component 110 transmits a reset command 122 to each of the computing resources 104 that are to be reset. In the example shown in FIG. 1, for instance, the resource reset component 110 has transmitted a reset command 122A to the computing resource 104A, has transmitted a reset command 122B to the computing resource 104B and has transmitted a reset command 122C to the computing resource 104N.

The reset command 122 instructs each computing resource 104 to reset its operation. Depending upon the type of computing resource 104, the reset operation might take different forms. For example, and as discussed briefly above, resetting a hardware device might consist of "rebooting" the device or performing an IPL. A virtual machine instance might also be rebooted in order to reset its operation. Resetting software components might involve terminating and restarting execution of the software components. The operation of other types of computing resources 104 might also be reset in other ways.

In some instances a computing resource 104 might be taken out of service prior to performing the reset. For example, a computing resource 104, such as a virtual machine instance, that is serving live network traffic might be taken out of service and replaced with another virtual machine instance prior to performing the reset operation. Once such a computing resource 104 has been reset, the computing resource 104 might be returned to serving live network traffic. Other types of processes might also be performed prior to and/or after a reset operation has been performed.

In some implementations, the resource reset component 110 also resets the operation of the identified computing resources 104 in a manner that satisfies the constraints 118 specified in the resource reset request 116. For example, and without limitation, the resource reset component 110 might cause only a certain number of resources 104 to be reset at a time in order to ensure that any restrictions on resource availability specified by the constraints 118 are satisfied. The resource reset component 110 might also take other types of actions to ensure that the computing resources 104 are reset in a manner that satisfies the specified constraints 118.

As one example of how the constraints 118 might be utilized to limit the computing resources 104 that are reset simultaneously, consider a fleet of computing resources 104 that includes 100 virtual machine instances executing software components that service requests for Web pages. In order to reset the resources 104 in the fleet and, at the same time, ensure that sufficient resources 104 are available in order to serve incoming traffic, the constraints 118 might specify that only 20% of the fleet is to be reset at a time. Using this information, the resource reset component 110 may then reset the operation of the resources 104 in the fleet such that no more than 20% of the fleet is out of service at a time as a result of the reset operation.

In order to provide the functionality above, the computing resources 104 are configured in some embodiments to provide resource state data 124 that describes aspects of their current operational state. For example, the resource state data 124 might indicate that a particular resource 104 has completed a reset operation. In the example shown in FIG. 1, for instance, the computing resource 104A has provided the resource state data 124A to the resource reset component 110, the computing resource 104B has provided the resource state data 124B to the resource reset component 110 and the computing resource 104N has provided the resource state data 124C to the resource reset component 110. In some implementations, the computing resources 104 might provide the resource state data 124 to another component, such as one of the data sources 126, which, in turn, exposes the resource state data 124 to other consumers, such as the resource reset component 110. Other configurations might also be utilized.

The resource reset component 110 may be configured to utilize the resource state data 124 provided by the computing resources 104 to reset the operation of the resources 104 in a manner that satisfies the specified constraints 118. For example, and without limitation, the resource reset component 110 may utilize the resource state data 124 to ensure that only a certain number or percentage of the computing resources 104 are out of service at one time due to being reset. The resource reset component 110 might also utilize the resource state data 124 to sequence the resetting of computing resources 104 in other ways.

In some embodiments, the resource reset component 110 also resets the computing resources 104 identified in a resource reset request 116 in a manner that satisfies other criteria specified through the management interface 114 or obtained in another manner. For example, and without limitation, only computing resources 104 in an identified group of computing resources 104 may be reset, the identified computing resources 104 might be reset in a specified order, and dependencies between the computing resources 104 might be utilized to determine the order in which the resources 104 are reset. Additionally, only computing resources 104 that have been designated as being resettable may be reset, and resources 104 may only be reset in response to resource reset requests 116 generated by users that have appropriate privileges to reset the resources 104. Additional details regarding the operation of the resource reset component 110 will be provided below with regard to FIG. 3.

Figure 2:
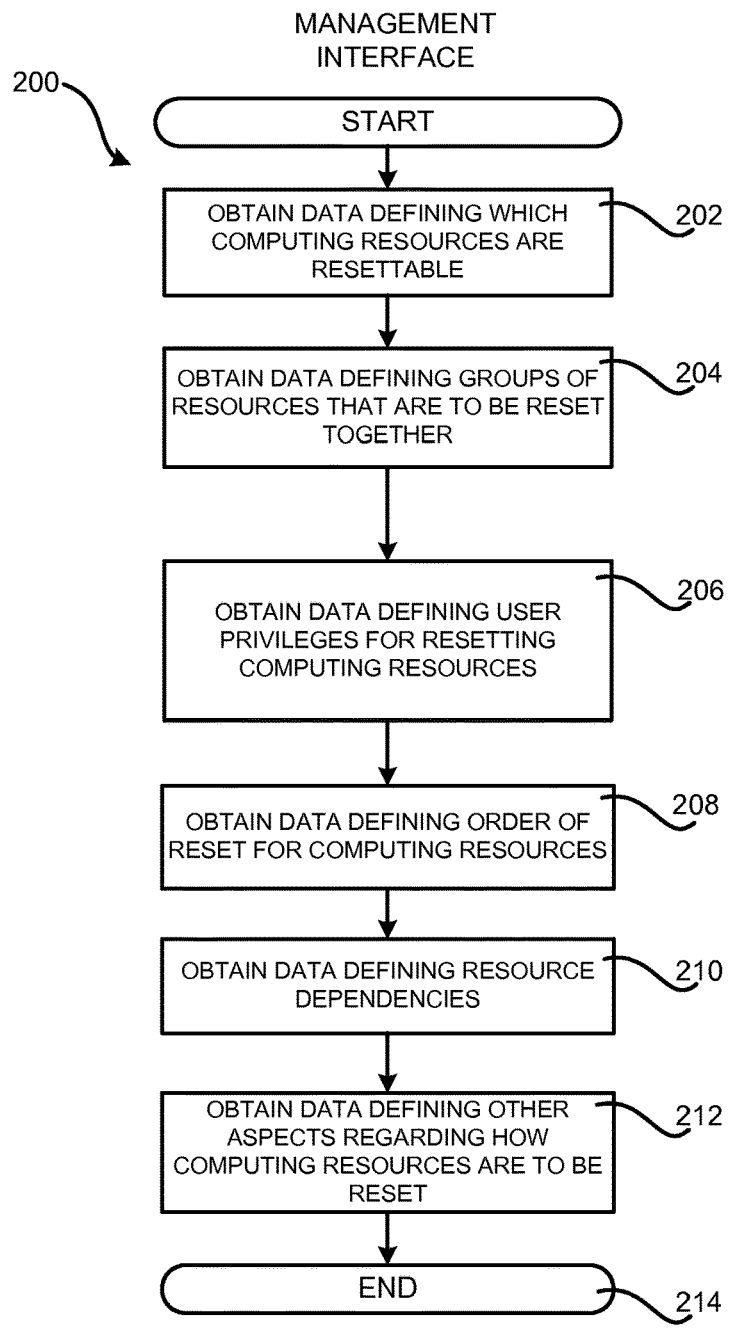
FIG. 2 is a flow diagram illustrating aspects of the operation of a management interface for managing aspects of the operation of a computing resource reset component configured to reset computing resources in a service provider network, according to one embodiment disclosed herein.

FIG. 2 is a flow diagram showing a routine 200 that illustrates aspects of the operation of the management interface 114 for managing aspects of the manner in which the computing resource reset component 110 resets computing resources 104, according to one embodiment disclosed herein. It should be appreciated that the logical operations described herein with respect to FIG. 2, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 200 begins at operation 202, where the resource reset component 110 obtains data defining the computing resources 104 that are eligible to be reset. As described briefly above, the management interface 114 may provide an interface, such as an API or a GUI, through which a user can mark computing resources 104 as being resettable in some embodiments. In this embodiment, the resource reset component 110 may be configured to reset only computing resources 104 that have been marked as being resettable. Resources 104 that have not been marked in this manner may not be reset by the resource reset component 110. In other embodiments, the resource reset component 110 obtains data identifying the resources 104 that are eligible to be reset from another data source 126.

From operation 202, the routine 200 proceeds to operation 204, where the resource reset component 110 obtains data defining groups of computing resources 104 that are to be reset together. In one embodiment, the management interface 114 provides an interface, such as an API or a GUI, through which a user can define groups of computing resources 104 that are to be reset simultaneously. For example, a user might be permitted to define a group of heterogeneous computing resources 104 that are to be reset together as a group. In another implementation, the resource reset component 110 obtains data defining the groups of computing resources 104 that are to be reset together from another data source 126. As will be discussed in greater detail below, the resource reset component 110 might utilize the defined groups to reset computing resources 104 when a resource reset request 116 is received.

From operation 204, the routine 200 proceeds to operation 206, where the resource reset component 110 obtains data defining the privileges of users to reset the computing resources 104. In one embodiment, the management interface 114 provides an interface, such as an API or a GUI, through which a user can define user privileges for resetting computing resources 104 in the service provider network 102. For instance, a user with sufficiently high privileges may be permitted to authorize other users to perform a reset of certain computing resources 104.

As a specific example, one user might be given permissions to reset certain resources 104, while another user is given privileges to reset the operation of other resources 104. Other users might not be permitted to reset computing resources 104. Other aspects regarding the privileges of individual users to reset computing resources 104 or groups of computing resources 104 might also be defined in a similar manner. The data defining the privileges of users to reset the computing resources 104 might also be obtained from other data sources 126 in other embodiments. As described in detail below, the resource reset component 110 might consult the privileges obtained at operation 206 to determine if a user has sufficient privileges prior to resetting the operation of any computing resources 104.

From operation 206, the routine 200 proceeds to operation 208, where the resource reset component 110 obtains data defining the order in which a group of computing resources 104 should be reset. In one embodiment, the management interface 114 provides an interface, such as an API or a GUI, through which a user can define the order in which a group of computing resources 104 should be reset. For example, a user might utilize this functionality to specify that computing resources 104 implementing database functionality are reset prior to resetting computing resources 104 that implement Web server functionality. In other embodiments, the data defining the order in which resources 104 in a group of computing resources 104 are to be reset is obtained from one or more other data sources 126. As will be described in greater detail below with regard to FIG. 3, the resource reset component 110 might utilize this information to reset computing resources 104 in the specified order when a resource reset request 116 is received.

From operation 208, the routine 200 proceeds to operation 210, where the resource reset component 110 obtains data defining the dependencies between computing resources 104 that are to be reset. For example, in one embodiment the management interface 114 provides an interface, such as an API or a GUI, through which a user can define dependencies between the resources 104 in the service provider network 102. For example, a resource dependency graph might be specified that identifies the computing resources 104 that each computing resource 104 is dependent upon. In other embodiments, the dependencies between resources 104 in the service provider network 102 are identified in an automated fashion. This might be accomplished, for instance, by monitoring the operation of the computing resources 104 to identify other computing resources 104 upon which they are dependent, if any. In other implementations, the resource reset component 110 obtains data 130 describing the dependencies between computing resources 104 from one or more other data sources 126.

As will be described in greater detail below, the resource reset component 110 may utilize the dependencies between computing resources 104 obtained at operation 210 to determine the order in which computing resources 104 are to be reset. For example, and without limitation, the resource reset component 110 might first reset dependent resources 104 and then reset the resources 104 upon which they depend. Additional details regarding this process are provided below with regard to FIG. 3.

From operation 210, the routine 200 proceeds to operation 212, where the resource reset component 110 obtains other preferences regarding how the computing resources 104 in the service provider network 102 are to be reset. For example, in one embodiment the data management interface 114 provides an interface, such as an API or a GUI, through which a user can define other preferences regarding how the computing resources 104 in the service provider network 102 are to be reset. These other preferences might also be obtained from one or more other data sources 126. The routine 200 then proceeds from operation 212 to operation 214, where it ends.

Figure 3:
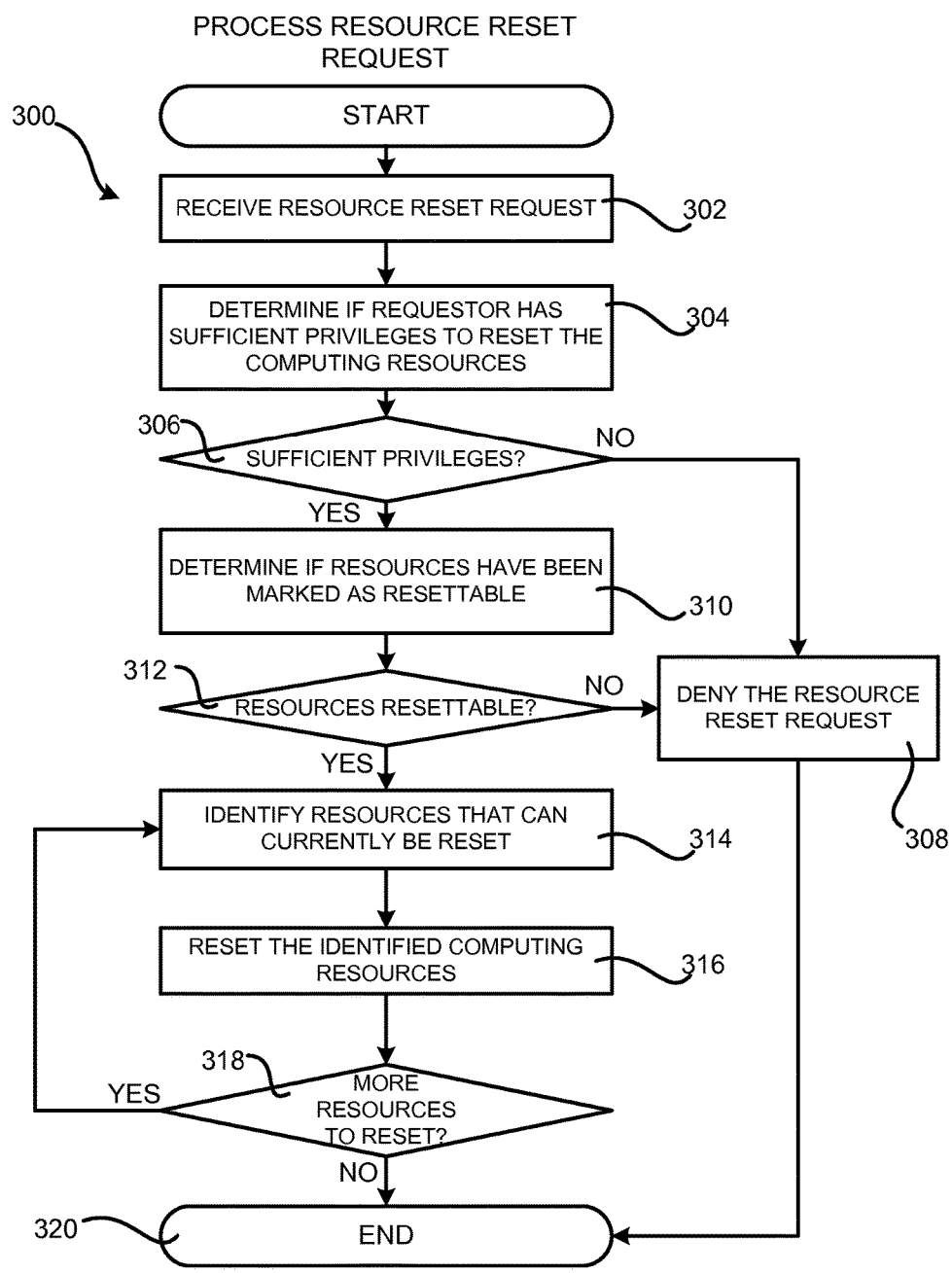
FIG. 3 is a flow diagram illustrating aspects of the operation of a resource reset component for processing a request to reset computing resources in a service provider network, according to one embodiment disclosed herein.

FIG. 3 is a flow diagram showing a routine 300 that illustrates aspects of the operation of the resource reset component 110 for processing a request 116 to reset computing resources 104 in the service provider network 102, according to one embodiment disclosed herein. The routine 300 begins at operation 302, where the reset request interface 112 receives a resource reset request 116. As discussed above, the resource reset request 116 specifies the computing resources 104 in the service provider network 102 that are to be reset. The resource reset request 116 might also specify one or more constraints 118 on the manner in which the identified resources 104 are reset.

From operation 302, the routine 300 proceeds to operation 304 where, in response to receiving the request 116, the resource reset component 110 determines whether the user or component submitting the received request 116 has sufficient privileges to reset the computing resources 104 identified in the request 116. If the user or component submitting the request 116 does not have sufficient privileges to reset the identified computing resources 104, the routine 300 proceeds from operation 306 to operation 308, where the received resource reset request 116 is denied. The routine 300 then proceeds from operation 308 to operation 320, where it ends.

If, at operation 306, the resource reset component 110 determines that the requestor does have sufficient privileges to reset the identified computing resources 104, the routine 300 proceeds from operation 306 to operation 310. At operation 310, the resource reset component 110 determines if the resources 104 identified by the received resource reset request 116 have been marked as resettable. If the identified resources 104 have not been marked as eligible for resetting, the routine 300 proceeds from operation 312 to operation 308, where the received resource reset request 116 is denied. The routine 300 then proceeds from operation 308 to operation 320, where it ends.

If, at operation 310, the resource reset component 110 determines that the resources 104 identified by the received resource reset request 116 have been marked as resettable, the routine 300 proceeds from operation 312 to operation 314. At operation 314, the resource reset component 110 identifies the resources 104 that can currently be reset. This might include for, example, identifying all of the computing resources 104 that currently satisfy the constraints and/or any other preferences specified with regard to how the computing resources 104 are to be reset. For example, and without limitation, the resource reset component 110 might identify only a certain number of the resources 104 specified in the request 116 as eligible for reset in view of any restrictions on resource availability specified by the constraints 118.

From operation 314, the routine 300 proceeds to operation 316, where the resource reset component 110 resets the operation of the resources 104 identified at operation 314. For example, and without limitation, the resource reset component 110 might reset the computing resources 104 identified operation 314 in a manner that satisfies any other criteria specified through the management interface 114. For example, and without limitation, only computing resources 104 in an identified group may be reset, the computing resources 104 might be reset in a specified order, and dependencies between the resources 104 might be utilized to determine the order in which the resources 104 are reset. Other considerations might also be taken into account when resetting the resources 104 identified at operation 314.

From operation 316, the routine 300 proceeds to operation 318, where the resource reset component 110 determines if additional computing resources 104 identified in the resource reset request 116 remain to be reset. If additional resources 104 remain to be reset, the routine 300 proceeds back to operation 314, described above. If no additional resources 104 remain to be reset, the routine 300 proceeds from operation 318 to operation 320, where it ends.

It should be appreciated that the mechanisms described above for resetting resources 104 in a service provider network 102 might be utilized in different ways in different implementations. For example, and without limitation, the mechanisms described above might be utilized to reset computing resources 104 in a specified fashion in response to the detection of a certain condition or event. In another particular implementation, the mechanisms described above may be utilized to test the resiliency of a service implemented using computing resources 104 in a service provider network 102. For example, the mechanism described above could be utilized to reset a certain subset of resources 104 utilized to implement particular functionality in order to simulate an outage. The manner in which non-reset resources 104 react to the outage may be monitored and utilized to evaluate the performance of the system. The mechanisms described above might also be utilized for other purposes not specifically described herein.

Figure 4:
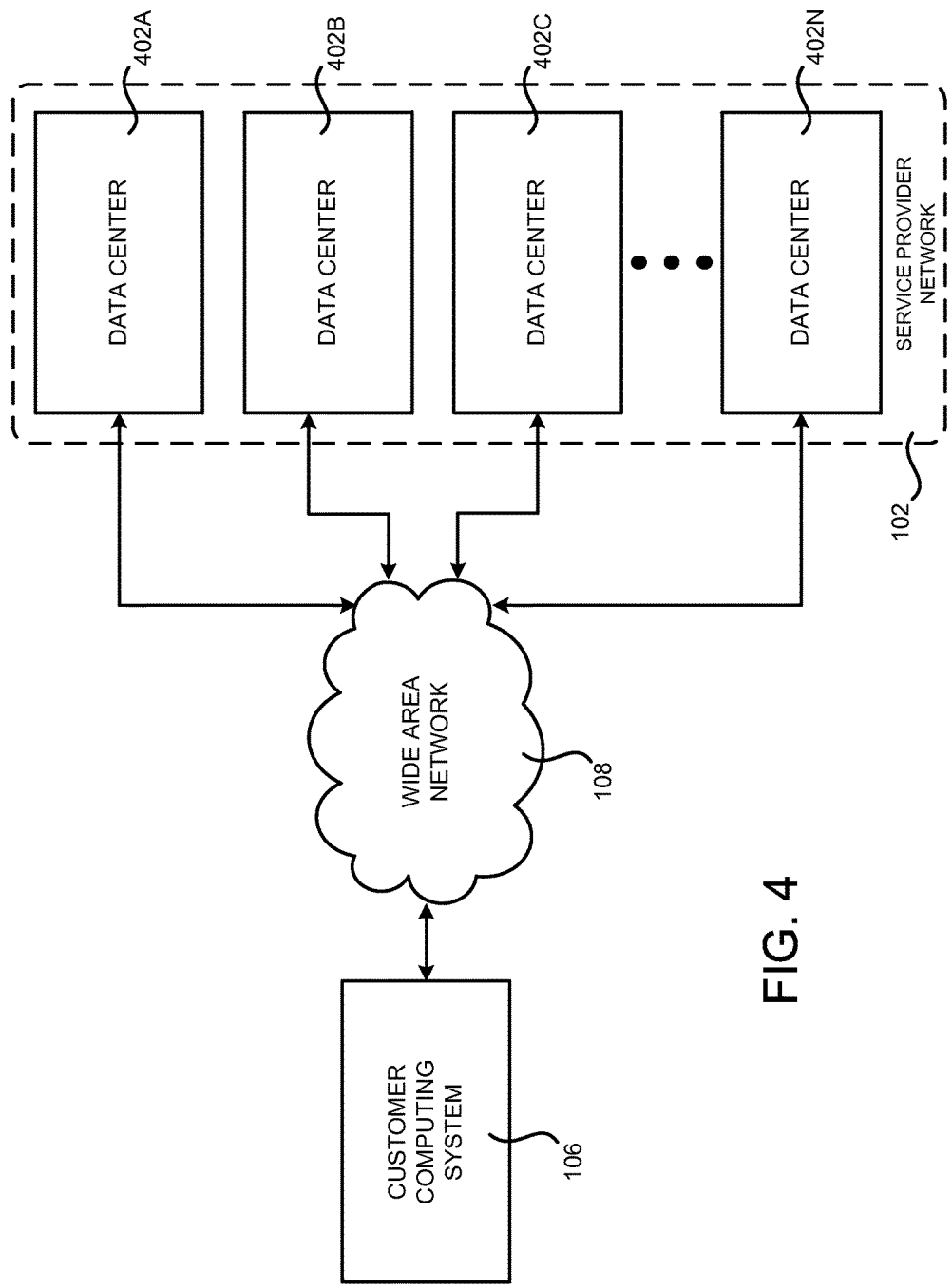
FIG. 4 is a system and network diagram that shows one illustrative operating environment for the embodiments disclosed herein that includes a service provider network that may be configured to provide the functionality described herein for resetting of computing resources thereby.

FIG. 4 is a system and network diagram that shows one illustrative operating environment for the embodiments disclosed herein that includes a service provider network 102 that may be configured to provide functionality for resetting computing resources 104 in the manner described above, according to one embodiment disclosed herein. As discussed briefly above, the service provider network 102 can provide computing resources 104 on a permanent or an as-needed basis. The computing resources 104 provided by the service provider network 104 may include various types of computing resources, such as data processing resources, data storage resources, networking resources, data communication resources, and the like. Each type of computing resource may be general-purpose or may be available in a number of specific configurations. For example, and as described briefly above, data processing resources may be available as virtual machine instances in a number of different configurations. The virtual machine instances may be configured to execute applications, including Web servers, application servers, media servers, database servers, and other types of applications. Data storage resources may include file storage devices, block storage devices, and the like. Additional details regarding some types of computing resources that may be offered for use through a service provider network 102 will be provided below with regard to FIG. 6.

The computing resources 104 provided by the service provider network 102 are enabled in one implementation by one or more data centers 402A-402N (which may be referred herein singularly as "a data center 402" or in the plural as "the data centers 402"). The data centers 402 are facilities utilized to house and operate computer systems and associated components. The data centers 402 typically include redundant and backup power, communications, cooling, and security systems. The data centers 402 might also be located in geographically disparate locations. One illustrative configuration for a data center 402 that implements the concepts and technologies disclosed herein for resetting the operation of computing resources 104 will be described below with regard to FIG. 5.

The customers and other users of the service provider network 102 may access the computing resources provided by the service provider network 102 over a WAN 108. Although a WAN 108 is illustrated in FIG. 4, it should be appreciated that a local-area network ("LAN"), the Internet, or any other networking topology known in the art that connects the data centers 402 to remote customers and other users may be utilized. It should also be appreciated that combinations of such networks might also be utilized.

Figure 5:
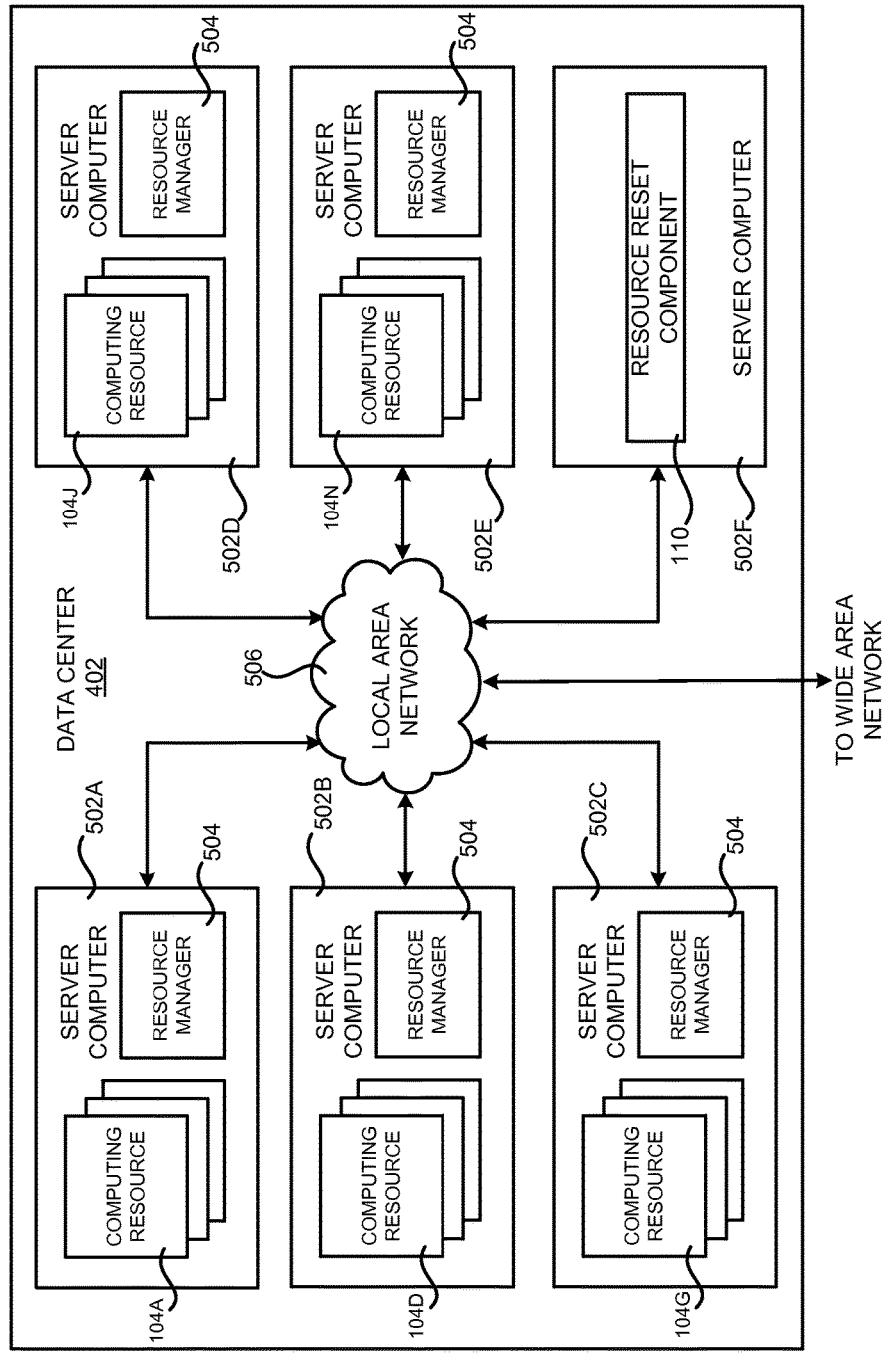
FIG. 5 is a computing system diagram that illustrates one configuration for a data center that implements aspects of the concepts and technologies disclosed herein for resetting the operation of computing resources provided by a service provider, according to one embodiment disclosed herein.

FIG. 5 is a computing system diagram that illustrates one configuration for a data center 402 that implements aspects of the concepts and technologies disclosed herein for resetting the operation of computing resources 104 provided by a service provider, according to one embodiment disclosed herein. The example data center 402 shown in FIG. 5 includes several server computers 502A-502F (which may be referred to herein singularly as "a server computer 502" or in the plural as "the server computers 502") for providing computing resources 104.

The server computers 502 may be standard tower, rackmount, or blade server computers configured appropriately for providing the computing resources 104 described herein. For example, in one implementation the server computers 502 are configured to provide the computing resources 104A-104N. As mentioned above, the computing resources 104 might be data processing resources, data storage resources, database resources, networking resources, and others. Some of the servers 502 might also be configured to execute a resource manager 504 capable of instantiating and/or managing resources 104. In the case of virtual machine instances, for example, the resource manager 504 might be a hypervisor or another type of program configured to enable the execution of multiple virtual machine instances on a single server 502, for example.

The data center 402 shown in FIG. 5 also includes a server computer 502F that may be reserved for executing various software components for managing the operation of the data center 402, the server computers 502, and the computing resources 104. In some embodiments, such as the embodiment described above with regard to FIG. 1, the server computer 602F might also be configured to execute the resource reset component 110. Other computing systems within the data center 402 might also be utilized to execute this component.

In the example data center 402 shown in FIG. 5, an appropriate LAN 506 is utilized to interconnect the server computers 502A-502F. The LAN 506 is also connected to the WAN 108 illustrated in FIG. 4. It should be appreciated that the configuration and network topology illustrated in FIGS. 1-5 has been greatly simplified and that many more computing systems, networks, and networking devices may be utilized to interconnect the various computing systems disclosed herein and to provide the functionality described above. Appropriate load balancing devices or software modules might also be utilized for balancing a load between each of the data centers 402A-402N, between each of the server computers 502A-502F in each data center 402, and, potentially, between computing resources 104 in each of the data centers 402. It should be appreciated that the data center 402 described with respect to FIG. 5 is merely illustrative and that other implementations might be utilized.

Figure 6:
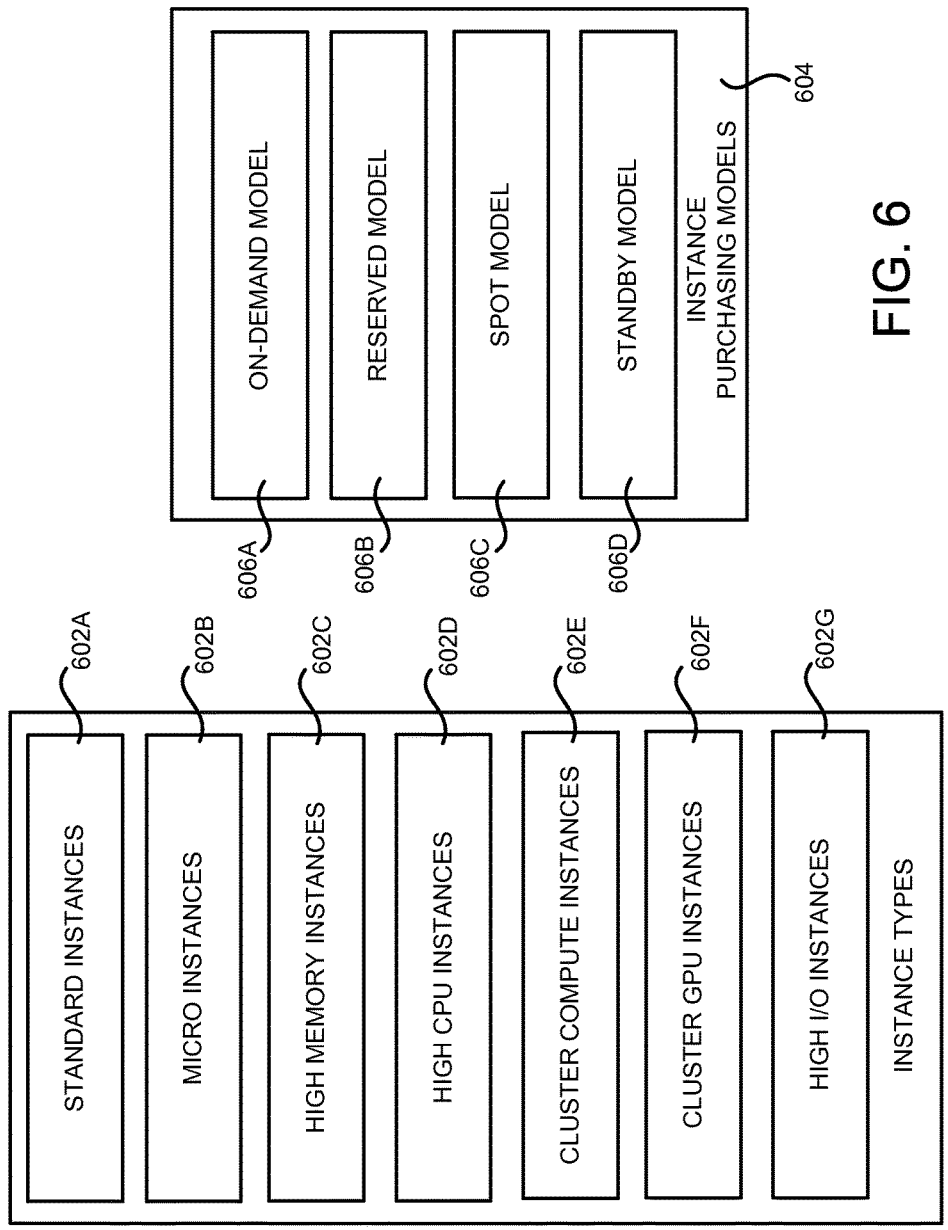
FIG. 6 is a block diagram showing aspects of various types of computing resources and purchasing models for the computing resources that might be provided by a computing service provider and reset utilizing the mechanisms disclosed herein.

FIG. 6 is a block diagram showing aspects of various types of computing resources 104 and purchasing models for the computing resources 104 that might be provided by a service provider network 102 and reset by the resource reset component 110 in embodiments disclosed herein. As described briefly above, one example of the computing resources 104 that might be provided by a service provider network 102 are data processing resources, such as virtual machine instances. The virtual machine instances provided by the service provider network 102 may be made available to customers in a number of different types, or configurations. FIG. 6 illustrates several example instance types that might be made available by a service provider through a service provider network 102: standard instances; micro instances; high memory instances; high central processing unit ("CPU") instances; cluster compute instances; cluster graphics processing unit ("GPU") instances, and high input/output ("I/O") instances. Aspects of each of these instance types will be described below.

Standard instances 602A are instances that are configured with generally proportional amounts of CPU and memory. Standard instances 602A may be suitable for common computing applications. Standard instances 602A may be made available in various sizes in some embodiments. For example, "small", "medium", "large", and "extra large" instances may be made available, with each of these instances having greater amounts of CPU and memory, while maintaining approximately similar ratios of CPU to memory.

Micro instances 602B are instances that provide a small amount of consistent CPU resources and allow CPU capacity to be increased in short bursts when additional cycles are available. Micro instances 602B may be suited for lower throughput applications and Web sites that require additional compute cycles periodically.

High memory instances 602C are instances that have proportionally more random access memory ("RAM") resources than CPU resources. High memory instances 602C may be suitable for high throughput applications, including database and memory caching applications. In contrast, high CPU instances 602D have proportionally more CPU resources than RAM memory resources and are well suited for compute-intensive applications.

Cluster compute instances 602E are instances that offer proportionally high CPU resources with increased network performance. Cluster compute instances 602E are well suited for High Performance Compute ("HPC") applications and other demanding network-bound applications. Cluster GPU instances 602F are virtual machine instances that provide general-purpose GPUs with proportionally high CPU and increased network performance for applications benefitting from highly parallelized processing, including HPC, rendering and media processing applications. While cluster compute instances 602E provide the ability to create clusters of instances connected by a low latency, high throughput network, cluster GPU instances 602F provide an additional option for applications that can benefit from the efficiency gains of the parallel computing power of GPUs over what can be achieved with traditional processors.

High I/O instances 602G are instances that provide very high disk I/O performance and are suited for high performance database workloads and other jobs that require high disk performance. High I/O instances 602G may utilize solid state-drive ("SSD")-based local instance storage for high I/O throughput. High I/O instances 602G might also provide high levels of CPU, memory, and network performance. It should be appreciated that the various instance types described above are merely illustrative. Other instance types not described herein might be utilized with the various concepts and technologies described herein. Additionally, in some embodiments, virtual machine instances may be made available in various sizes having continuous ratios of CPU to memory.

It should also be appreciated that the various instance types described above might be utilized with various operating systems. For example, a customer of a service provider might request to execute a high CPU instance 602D executing the LINUX operating system. Similarly, a customer or other user of the service provider network 102 might request to use a cluster compute instance 602E executing the MICROSOFT WINDOWS SERVER operating system. Other operating systems might also be utilized.

As also shown in FIG. 6, the various instance types described above, and the other computing resources 104 described herein, might be priced according to various instance purchasing models 604. For instance, in the example shown in FIG. 6, computing resources 104 may be priced according to an on-demand model 606A, a reserved model 606B, a spot model 606C, and/or a standby model 606D. Aspects of each of these purchasing models are described in greater detail below.

Computing resources 104 priced according to the on-demand model 606A are resources that are paid for and in active use by a customer. The on-demand model 606A allows customers of a service provider to pay for capacity per unit of time, such as an instance-hour, without requiring a long-term commitment. This may free the customer from the costs and complexities of planning, purchasing, and maintaining hardware, and might effectively transform what are commonly large fixed costs into much smaller variable costs.

Computing resources 104 priced according to the reserved model 606B are computing resources 104 that are reserved for a customer in exchange for a payment. The reserved model 606B provides a customer the option to make a one-time payment for each resource 104 they want to reserve. In turn, the customer may receive a discount on the hourly usage charge for reserved computing resources 104 as compared to on-demand resources. After the customer makes the one-time payment for reserved computing resources 104, the reserved resources are reserved for the customer and the customer has no further obligation. The customer may choose to run the reserved resources 104 for the discounted usage rate for the duration of a chosen term. If the customer does not use the reserved resources, the customer will not pay usage charges on these resources 104.

The spot model 606C allows customers to bid on unused capacity in a service provider network 102. The customer can run the resources 104 priced according to the spot model 606C for as long as their bid exceeds a current market price, called the "spot market price". The spot market price may fluctuate based upon the supply of resources and the customer demand for the resources. Spot resources may be terminated if a customer's maximum bid no longer exceeds the current spot market price.

In order to obtain spot resources, a customer may place a request for spot resources that specifies the type and desired number of spot resources and the maximum price the customer is willing to pay. If the customer's maximum price bid exceeds the current spot market price for desired resources, the customer's request will be fulfilled and the customer's spot resources will run until either the customer chooses to terminate them or the spot market price increases above the customer's maximum price (whichever is sooner). Various components operating within a service provider network 102 may manage the market for the spot resources, including setting the current spot market price.

Computing resources 104 purchased according to the standby model 606D, which might be referred to as "standby resources", are resources 104 that have been acquired on behalf of a customer and that are made ready for near immediate use by the customer in the manner described herein. The price charged for standby resources is typically less than the price charged for on-demand resources, since the standby resources may be terminated in the same manner as spot resources. In one embodiment, standby resources are priced higher than spot resources and reserved resources, but lower than on-demand resources.

It should be appreciated that the various purchasing models 604 described above are merely illustrative and that other mechanisms may be utilized to set the pricing for the various types of computing resources 104 provided by a service provider network 102. It should also be appreciated that the embodiments disclosed herein may be utilized with any of the resource types and purchasing models 604 shown in FIG. 6 and other configurations of computing resources 104 and purchasing models 604 not shown in FIG. 6 or described herein. Additionally, it should be appreciated that other types of computing resources 104 might also be priced according to the purchasing models 604 shown in FIG. 6 or other purchasing models. As discussed above, the embodiments disclosed herein might also be utilized with other types of computing resources 104, such as data storage resources, database resources, networking resources, and others. These resources might also be available in various configurations, capacities, arrangements, and priced according to various purchasing models.

Figure 7:
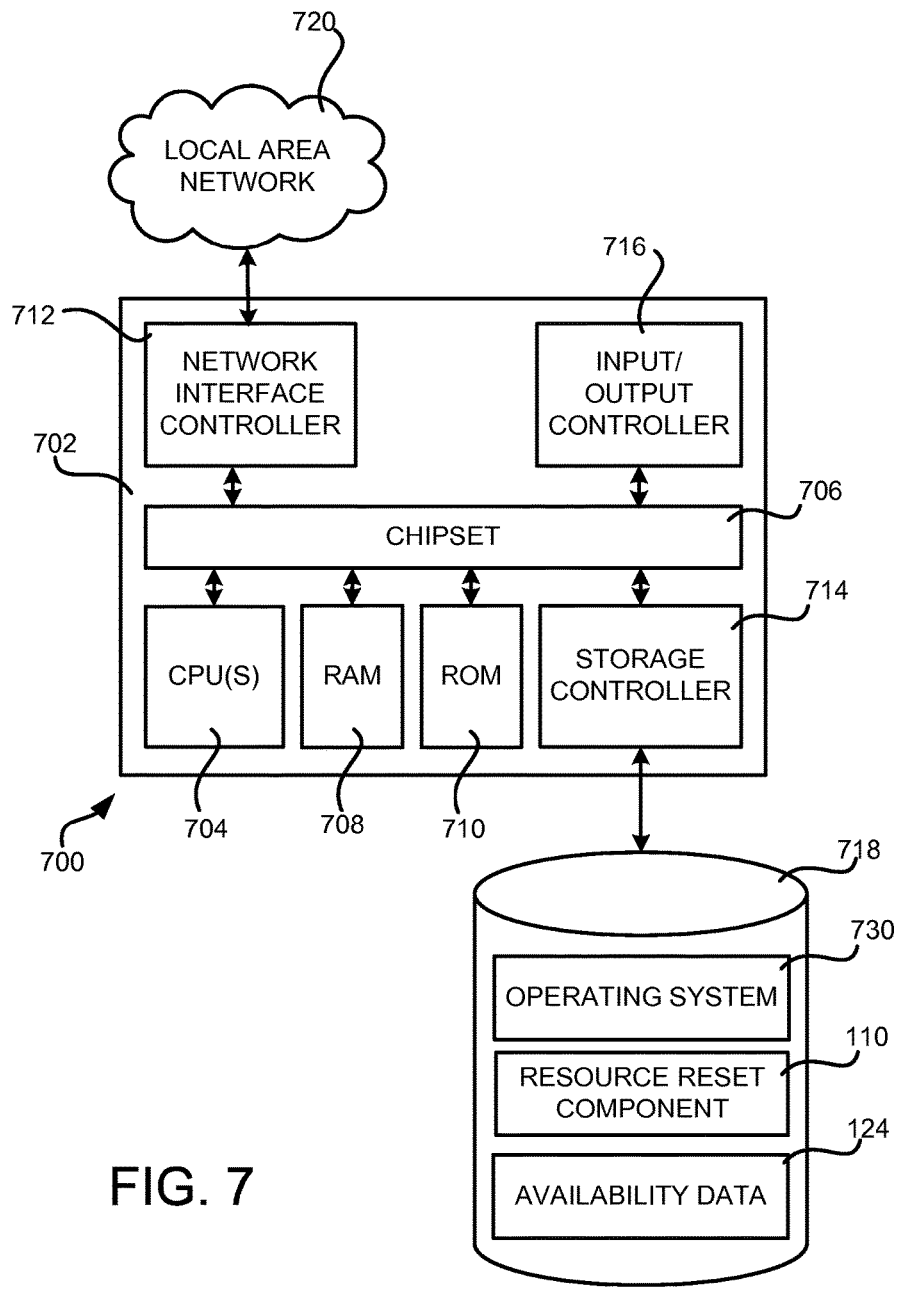
FIG. 7 is a computer architecture diagram showing an illustrative computer hardware architecture for implementing a computing device that might be utilized to implement aspects of the various embodiments presented herein.

FIG. 7 shows an example computer architecture for a computer 700 capable of executing the program components described above for resetting the operation of computing resources 104 in a service provider network 102. The computer architecture shown in FIG. 7 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 7 may be utilized to execute the resource reset component 110 shown in FIG. 1, and described above. The computer architecture shown in FIG. 7 might also be utilized to implement the customer computing system 106.

The computer 700 includes a baseboard 702, or "motherboard," which is a printed circuit board to which a multitude of components or devices may be connected by way of a system bus or other electrical communication paths. In one illustrative embodiment, one or more central processing units ("CPUs") 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a RAM 708, used as the main memory in the computer 700. The chipset 706 may further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM may also store other software components necessary for the operation of the computer 700 in accordance with the embodiments described herein.

The computer 700 may operate in a networked environment using logical connections to remote computing devices and computer systems through a network, such as the local area network 720. The chipset 706 may include functionality for providing network connectivity through a NIC 712, such as a gigabit Ethernet adapter. The NIC 712 is capable of connecting the computer 700 to other computing devices over the network 720. It should be appreciated that multiple NICs 712 may be present in the computer 700, connecting the computer to other types of networks and remote computer systems.

The computer 700 may be connected to a mass storage device 718 that provides non-volatile storage for the computer. The mass storage device 718 may store system programs, application programs, other program modules, and data, which have been described in greater detail herein. The mass storage device 718 may be connected to the computer 700 through a storage controller 714 connected to the chipset 706. The mass storage device 718 may consist of one or more physical storage units. The storage controller 714 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 may store data on the mass storage device 718 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 718 is characterized as primary or secondary storage, and the like.

For example, the computer 700 may store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 718 by detecting the physical states or characteristics of one or more particular locations within the physical storage units.

In addition to the mass storage device 718 described above, the computer 700 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 700.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 718 may store an operating system 730 utilized to control the operation of the computer 700. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 718 may store other system or application programs and data utilized by the computer 700, such as the resource reset component 110, the resource state data 124, and/or any of the other software components and data described above. The mass storage device 718 might also store other programs and data not specifically identified herein.

In one embodiment, the mass storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various routines described above with regard to FIGS. 2 and 3. The computer 700 might also include computer-readable storage media for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, the input/output controller 716 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Based on the foregoing, it should be appreciated that technologies for resetting the operation of computing resources 104 in a service provider network 102 have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-readable storage medium having computer-executable instructions stored thereupon which, when executed by a computer, cause the computer to:
    expose an interface for resetting computing resources provided by a service provider network;
    obtain data designating two or more computing resources operating in the service provider network as being resettable or not resettable by way of the interface;
    receive, from a user and by way of the interface, a request for resetting the two or more computing resources, the two or more computing resources comprising two or more virtual machine instances and the request comprising one or more constraints, wherein the one or more constraints comprise a constraint specifying at least a limit on a number or a percentage of computing resources out of the two or more computing resources that can be simultaneously out of service as a result of a reset operation;
    determine that the two or more computing resources have been designated as being resettable by way of the interface;
    receive resource state data from the two or more computing resources that describes current operational states of the two or more computing resources; and
    in response to receiving the request and determining that the two or more computing resources have been designated as being resettable and based at least in part on the resource state data of the two or more computing resources, cause the two or more computing resources operating in the service provider network to be reset in a manner that satisfies the one or more constraints specified in the request, so as to not exceed the limit on the number or the percentage of computing resources that are simultaneously out of service as a result of being reset.

2. The computer-readable storage medium of claim 1, wherein the one or more constraints comprise first constraints for a first type of computing resource in the service provider network and second constraints for a second type of computing resource in the service provider network.

3. The computer-readable storage medium of claim 1, wherein the two or more computing resources further comprise one or more of a hardware device, a software component, a service, or a storage system.

4. The computer-readable storage medium of claim 1, having further computer-executable instructions stored thereupon which, when executed by the computer, cause the computer to:
    obtain privileges for the user to reset the one or more computing resources;
    determine, based upon the privileges, that the user submitting the request has sufficient privileges to reset the two or more computing resources; and
    cause the two or more computing resources to be reset in response to determining that the user has sufficient privileges to reset the two or more computing resources.

5. The computer-readable storage medium of claim 1, wherein causing the two or more computing resources operating in the service provider network to be reset comprises causing the two or more computing resources to be reset in an order determined based upon one or more dependencies between the two or more computing resources.

6. The computer-readable storage medium of claim 1, having further computer-executable instructions stored thereupon which, when executed by the computer, cause the computer to:
    receive the request, the request further comprising:
        instructions for resetting a virtual machine instance and a data storage resource, and
        at least a first constraint specific to virtual machine type computing resources in the service provider network and a second constraint specific to data storage type resources in the service provider network,
    wherein causing the two or more computing resources to be reset includes causing the virtual machine instance and the data storage resource to be reset in the manner that satisfies the first constraint and the second constraint specified in the request.

7. The computer-readable storage medium of claim 1, wherein the one or more constraints comprise a constraint that defines a period of time during which the two or more computing resources should be reset.

8. An apparatus for resetting computing resources operating in a service provider network, the apparatus comprising:
    a processor; and
    a computer-readable storage medium having instructions stored thereupon which are executable by the processor and which, when executed, cause the apparatus to:
        expose an interface for resetting computing resources provided by the service provider network,
        obtain data designating two or more computing resources operating in the service provider network as being resettable,
        receive, from a user and by way of the interface, a request for resetting the two or more computing resources, the request specifying one or more constraints,
        determine that the two or more computing resources have been designated as being resettable, receive resource state data from the two or more computing resources that describes current operational states of the two or more computing resources, and in response to receiving the request and determining that the two or more computing resources have been designated as being resettable and based at least in part on the resource state data of the two or more computing resources, cause the two or more computing resources operating in the service provider network to be reset in a manner that satisfies the one or more constraints specified in the request, so as to not exceed a limit on number or percentage of computing resources that are simultaneously out of service as a result of being reset.

9. The apparatus of claim 8, wherein the one or more constraints comprise a constraint that defines the limit on the number or the percentage of computing resources that can be simultaneously out of service as a result of a reset operation.

10. The apparatus of claim 8, wherein the computer-readable storage medium has further computer-executable instructions stored thereupon which, when executed by the processor, cause the apparatus to:

obtain data defining a group of computing resources in the service provider network to be reset simultaneously, and wherein causing the two or more computing resources operating in the service provider network to be reset comprises causing at least two computing resources in a defined group of computing resources to be reset simultaneously and in the manner that satisfies the one or more constraints specified in the request.

11. The apparatus of claim 8, wherein the computer-readable storage medium has further computer-executable instructions stored thereupon which, when executed by the processor, cause the apparatus to:

obtain data defining an order in which the two or more computing resources in the service provider network are to be reset, and wherein causing the two or more computing resources operating in the service provider network to be reset comprises causing the two or more computing resources to be reset in the order and in the manner that satisfies the one or more constraints specified in the request.

12. The apparatus of claim 8, wherein the computer-readable storage medium has further computer-executable instructions stored thereupon which, when executed by the processor, cause the apparatus to:

obtain data defining dependencies between the two or more computing resources, and wherein causing the two or more computing resources operating in the service provider network to be reset comprises causing the two or more computing resources to be reset in an order determined based upon the dependencies between the two or more computing resources and in the manner that satisfies the one or more constraints specified in the request.

13. A computer-implemented method for resetting computing resources provided by a service provider network, the method comprising performing computer-implemented operations for:

exposing an interface for resetting computing resources provided by the service provider network;

obtaining resource resettable data designating two or more computing resources operating in the service provider network as being resettable;

receiving, from a user and by way of the interface, a request for resetting the two or more computing resources, the two or more computing resources comprising two or more virtual machine instances;

determining based upon the resource resettable data that the two or more computing resources have been designated as being resettable;

receiving resource state data from the two or more computing resources that describes current operational states of the two or more computing resources; and in response to receiving the request and determining that the two or more computing resources have been designated as being resettable by way of the interface and based at least in part on the resource state data of the two or more computing resources, causing the two or more computing resources operating in the service provider network to be reset in an order determined based upon dependencies between the two or more computing resources, so as to not exceed a limit on number or percentage of computing resources that are simultaneously out of service as a result of being reset.

14. The computer-implemented method of claim 13, wherein the request further comprises one or more constraints, and wherein causing the two or more computing resources to be reset comprises causing the two or more computing resources operating in the service provider network to be reset in a manner that satisfies the one or more constraints specified in the request.

15. The computer-implemented method of claim 14, wherein the one or more constraints define the limit on the number or the percentage of computing resources that can be simultaneously out of service as a result of a reset operation.

16. The computer-implemented method of claim 14, wherein the resource state data is utilized to ensure that the two or more computing resources operating in the service provider network are reset in the manner that satisfies the one or more constraints specified in the request.

17. The computer-implemented method of claim 14, wherein the one or more constraints comprise first constraints for a first type of computing resource in the service provider network and second constraints for a second type of computing resource in the service provider network.

18. The computer-implemented method of claim 14, wherein the two or more computing resources further comprise one or more of a hardware device, a software component, a service, or a storage system.

19. The computer-implemented method of claim 14, further comprising:

obtaining data defining privileges for the user to reset the two or more computing resources;

determining based upon the privileges that the user submitting the request has sufficient privileges to reset the two or more computing resources; and causing the two or more computing resources operating in the service provider network to be reset in response to determining that the user has sufficient privileges to reset the two or more computing resources.

20. The computer-implemented method of claim 14, further comprising obtaining data defining a group of computing resources in the service provider network to be reset simultaneously, and wherein causing the two or more computing resources operating in the service provider network to be reset comprises causing at least two computing resources in the group of computing resources to be reset simultaneously.

21. The computer-implemented method of claim 13, wherein the order is further defined in the request such that the user defines that computing resources of a first type of computing resource are reset before resetting computing resources of a second type of computing resource.

22. The computer-implemented method of claim 14, wherein the one or more constraints comprise a constraint that defines a period of time during which the two or more computing resources should be reset.

\* \* \* \* \*